United States Patent [19]

Alfieri

[11] Patent Number: 5,745,778
[45] Date of Patent: Apr. 28, 1998

[54] APPARATUS AND METHOD FOR IMPROVED CPU AFFINITY IN A MULTIPROCESSOR SYSTEM

[75] Inventor: Robert A. Alfieri, Chapel Hill, N.C.

[73] Assignee: Data General Corporation, Westboro, Mass.

[21] Appl. No.: 187,665

[22] Filed: Jan. 26, 1994

[51] Int. Cl.[6] .................................................... G06F 15/00
[52] U.S. Cl. ..................... 395/800.01; 395/673; 395/460; 395/676; 395/706
[58] Field of Search ........................ 395/800, 425, 395/650, 700, 449, 672, 673, 675, 677, 800.01, 400, 676, 706; 364/243.45, 964.343

[56] References Cited

U.S. PATENT DOCUMENTS

| | | | |
|---|---|---|---|
| 5,241,641 | 8/1993 | Iwasa et al. | 395/449 |
| 5,247,675 | 9/1993 | Farrell et al. | 395/673 |
| 5,261,053 | 11/1993 | Valencia | 395/460 |
| 5,265,235 | 11/1993 | Sindhu et al. | 395/447 |
| 5,276,848 | 1/1994 | Gallagher et al. | 395/448 |
| 5,297,265 | 3/1994 | Frank et al. | 395/412 |
| 5,379,432 | 1/1995 | Orton et al. | 395/683 |
| 5,442,758 | 8/1995 | Slihgwine et al. | 395/608 |
| 5,535,393 | 7/1996 | Reeve et al. | 395/706 |
| 5,553,305 | 9/1996 | Gregor et al. | 395/676 |

OTHER PUBLICATIONS

Yu et al., "Impact of Workload Partitionability on the Performance of Coupling Architectures for Transaction Processing," IEEE, 1992, pp. 40–49.

Fowler et al., "Improving Processsor and Cache Locality in Fine–Grain Parallel Computations using Object–Affinity Scheduling and Continuatious Passing", Jun. 1992, pp. 1–18.

Markatos et al., "Using Processor Affinity in Loop Scheduling on Shared–Memory Multiprocessors," Mar. 1992, pp. 1–31.

Ni et al., "Design Tradeoffs for Process Scheduling in Shared Memory Multiprocessor Systems," IEEE, 1989, pp. 327–334.

Kontothanassis, "The Mercury User's Manual," Aug. 1993, pp. 1–18.

Squillante et al.,"Using Processor–Cache Affinity Information in Shaved–Memory Multiprocessor Scheduling," IEEE, 1993, pp. 131–143.

Primary Examiner—Alyssa H. Bowler
Assistant Examiner—John Follansbee
Attorney, Agent, or Firm—Robert L. Dulaney

[57] ABSTRACT

Closely related processing threads within a process in a multiprocessor system are collected into thread groups which are globally scheduled as a group based on the thread group structure's priority and scheduling parameters. The thread group structure maintains collective timeslice and CPU accounting for all threads in the group. Within each thread group, each individual thread has a local scheduling priority for scheduling among the threads in its group. The system utilizes a hierarchy of processing levels and run queues to facilitate affining thread groups with processors or groups of processors when possible. The system will tend to balance out the workload among system processors and will migrate threads groups up and down through processing levels to increase cache hits and overall performance. The system is periodically reset to avoid long term unbalanced operation conditions.

32 Claims, 9 Drawing Sheets

APPARATUS AND METHOD FOR IMPROVED CPU AFFINITY IN A MULTIPROCESSOR SYSTEM

BACKGROUND OF THE INVENTION

1. Field of the Invention

The present invention relates generally to computer operating systems and more particularly to a method for dynamically adjusting the affinity between CPUs and processing threads in a multiprocessor system.

2. Description of the Prior Art

Threads are programming constructs that facilitate efficient control of numerous asynchronous tasks. Since they closely map to the underlying hardware, threads provide a popular programming model for applications running on symmetric multiprocessing systems.

As standard thread interfaces, such as the POSIX P1003.4a portable operating systems programming standard propagated by the Technical Committee on Operating Systems of the IEEE Computer Society, become more common, an increasing number of portable applications employing threads are being written and more operating system vendors are providing thread support. Threads can provide significant performance gains over sequential process execution. By breaking down a process into multiple threads, different processors in the system can be operating on different portions of the process at the same time. Applications that can take particular advantage of threads include, for example, database servers, real-time applications and parallelizing compilers.

Modern multiprocessing systems can have eight or more individual processors sharing processing tasks. Many such systems incorporate caches that are shared by a subset of the system's processors. One problem with many prior art multiprocessor systems, however, is poor processor and cache affinity when a process executing on the system creates multiple processing threads during its execution. In some prior art systems, each thread is assigned an individual priority and is individually scheduled on a global basis throughout the system. In other prior art systems, individual threads can be affined to individual CPUs, but there is no concept of affining groups of related threads from the same process to a groups of CPUs to improve secondary cache affinity while improving efficiency of operations among threads in the same group and reducing overhead for operations between groups. Prior art systems also lack a method for automatically modifying affinity and migrating groups of related threads while maintaining local efficiency. When multiple related threads, which tend to access the same data, are distributed across multiple processor groups, an undesirably high level of data swapping in and out of the system caches can occur.

SUMMARY OF THE INVENTION

The present invention relates to a method of operation of a multiprocessor data processing system using an enhanced method of organizing and scheduling threads.

It is a feature of the invention that processing threads are collected into thread groups.

It is another feature of the invention that each thread group has a global priority and is schedulable on a global basis.

It is a further feature of the invention that each thread has a local priority for scheduling within its thread group.

It is yet another feature of the invention that a plurality of run queues are employed.

It is yet a further feature of the invention that thread groups can be dynamically moved to different run queues during system operation.

It is an advantage of the invention that cache affinity is improved.

It is another advantage of the invention that the processor work load balancing is improved.

It is a further advantage that the local operation performance is improved and intergroup processing overhead is reduced.

Other features and advantages of the present invention will be understood by those of ordinary skill in the art after referring to the detailed description of the preferred embodiment and drawings.

DESCRIPTION OF THE PREFERRED EMBODIMENT

System Overview

Figure 1:
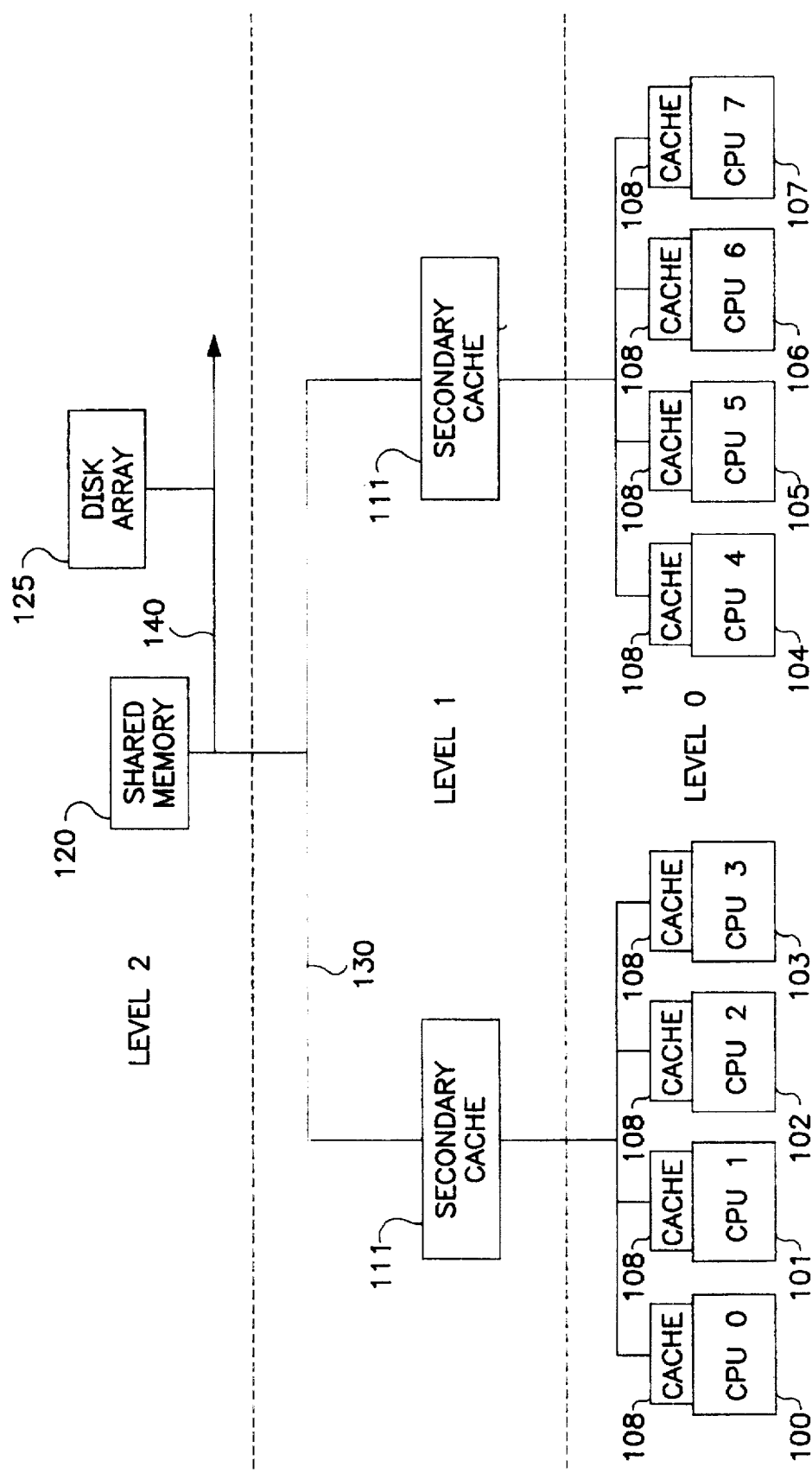
FIG. 1 is a overview of a multiprocessor data processing system.

Referring to FIG. 1, an overview of a multiprocessing data processing system 150 is depicted. For clarity and ease of presentation, an eight processor system has been depicted. As will be readily appreciated by those of ordinary skill in the art, the invention is applicable to multiprocessor systems having other numbers of processors. It is also not necessary that each processor group have four members or that all processor groups have the same number of processors.

Each CPU 100–107 has individual primary caches 108. Typically, caches 108 will include at least separate data and instruction caches, each being, for example, 8K bytes of random access memory. In addition to the instruction and data cache components of caches 108, an additional cache memory of, for example, 1 megabyte of random access memory may be included as a part of caches 108 in a typical system. CPUs 100–103 are connected to secondary cache 110. CPU's 104–107 are connected to secondary cache 111. Caches 110 and 111 are connected via main system bus 130 to shared memory 120. I/O bus 140 connects disk array 125 and other typical data processing elements not shown. In a preferred eight processor embodiment, secondary caches 110 and 111 are each 32 megabytes and shared memory 120 is 1 gigabyte of random access memory. Other sizes for each of these memory elements could readily have been employed.

Thread Groups

As disclosed herein, a "thread group" is a set of closely-related threads within a process that will tend to access and operate on the same data. Handling these related threads as a single globally schedulable group promotes a closer relationship between the threads in the group and individual processors or groups of processors, thereby improving the ratio of cache hits and overall system performance. In addition to improved processor affinity, additional efficiencies are achieved by having these groups of closely-related threads use, at the group level, a common priority, scheduling policy, timeslice and CPU accounting. Since threads in a thread group will share scheduling resources, thread-to-thread operations within a thread group will be faster than thread-to-thread operations that cross group boundaries.

Figure 2:
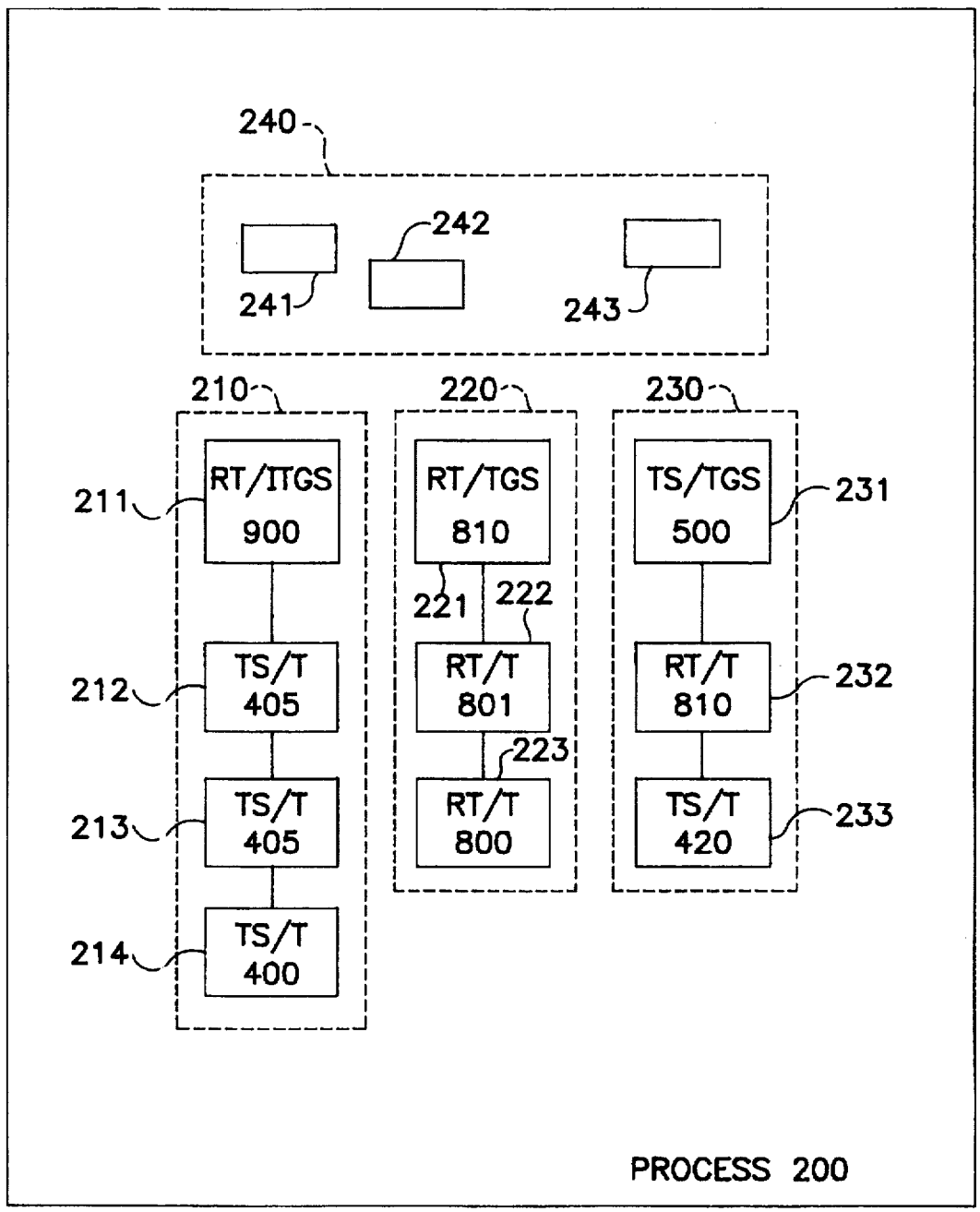
FIG. 2 shows the internal organization of a process executing on system 150.

Referring to FIG. 2, a diagram of a typical process 200 running on system 150 is shown. Process 200 contains thread groups 210, 220 and 230. TG 210 is a real-time (RT) thread and was the initial thread group in process 200. TG 210 has thread group structure (TGS) 211 and three timesharing (TS) threads 212-214 within its thread group. TG 220 has thread group structure 221 and RT threads 222 and 223. TG 230 has thread group structure 231, RT 232 and TS 233. As will be discussed in more detail below, the number appearing within each thread group structure box 211, 221, and 231 in FIG. 2 indicates the thread group's global scheduling priority across the system. The number appearing within each thread box indicates the thread's priority within its particular thread group.

Also conceptually located within process 200 in FIG. 2, is the set of data 240, access to which potentially will be required by threads during execution of process 200. In FIG. 2, data 241 represents the subset of data 240 that supports the task to be performed by the threads within TG 210. Similarly, data 242 and 243 support the tasks to be performed by the threads within TGs 220 and 230.

A thread group can be created as either a realtime group, such as thread group 211 or 220, or a timesharing group, such as 230, and either type of thread group can have realtime threads, timesharing threads or a combination within its group. Active threads in a process may create one or more additional threads. When a new thread is created, it can be created within the creating thread's thread group, within another existing thread group, or it can be made the initial thread in a new thread group. For example, TG 220 may have been created by a thread within process 200 or by a thread in another process in the system. If a thread is being formed as the initial thread in a new thread group, the new thread group's thread group structure is first created by inheriting the thread group structure of the creating thread's thread group. Then the new thread is created in the newly created thread group. The creating thread assigns the local scheduling and priority to the newly created thread. Unless otherwise specified, the newly created thread will inherit the local scheduling policy and priority of its creating thread. The newly created thread may have a priority that is higher, lower or the same as the priority of the thread that created it. Similarly, individual threads within a thread group may have a priority that is higher, lower or the same as the priority of its thread group.

The thread group is the basic unit of global scheduling across the system. The thread group structure maintains the global scheduling policy and global priority which are used to schedule the execution of the thread group. The thread group structure also maintains the cumulative timeslice and CPU accounting for all threads in its thread group, so timeslicing and CPU accounting records for individual threads within a thread group are not necessary. Each individual thread within the thread group maintains the thread priority and scheduling policy for itself.

The particular method used by a CPU in selecting a thread group to execute is discussed below. Once a particular thread group is selected for execution, the individual thread to be executed is selected based on the local priority and scheduling policy of the threads within the group. Selection of a thread for execution, therefore, occurs at two independent levels: global scheduling of a thread group followed by local scheduling of one of that thread group's threads. The priorities of the individual threads within a thread group have no bearing on the scheduling of the thread group itself, which is based solely on the thread group's priority in the the thread group structure.

Execution of a process will often involve a plurality of thread groups, each with a plurality of threads. The use of thread groups in developing a process gives the user the flexibility to choose between creating a new thread within an existing thread group or created a new thread group. The user can make that decision based on the most efficient approach to handle the various tasks within the process. If, for example, a number of threads are being used to work on a particular calculation and all threads will require access to the same set of data, those threads properly belong in a single thread group. On the other hand, if a process is going to initiate a new task within the process that is not closely coupled with the task of an existing thread group and the threads of the new task will require access to a different subset of Data 240, then a new thread group is indicated.

Figure 4:
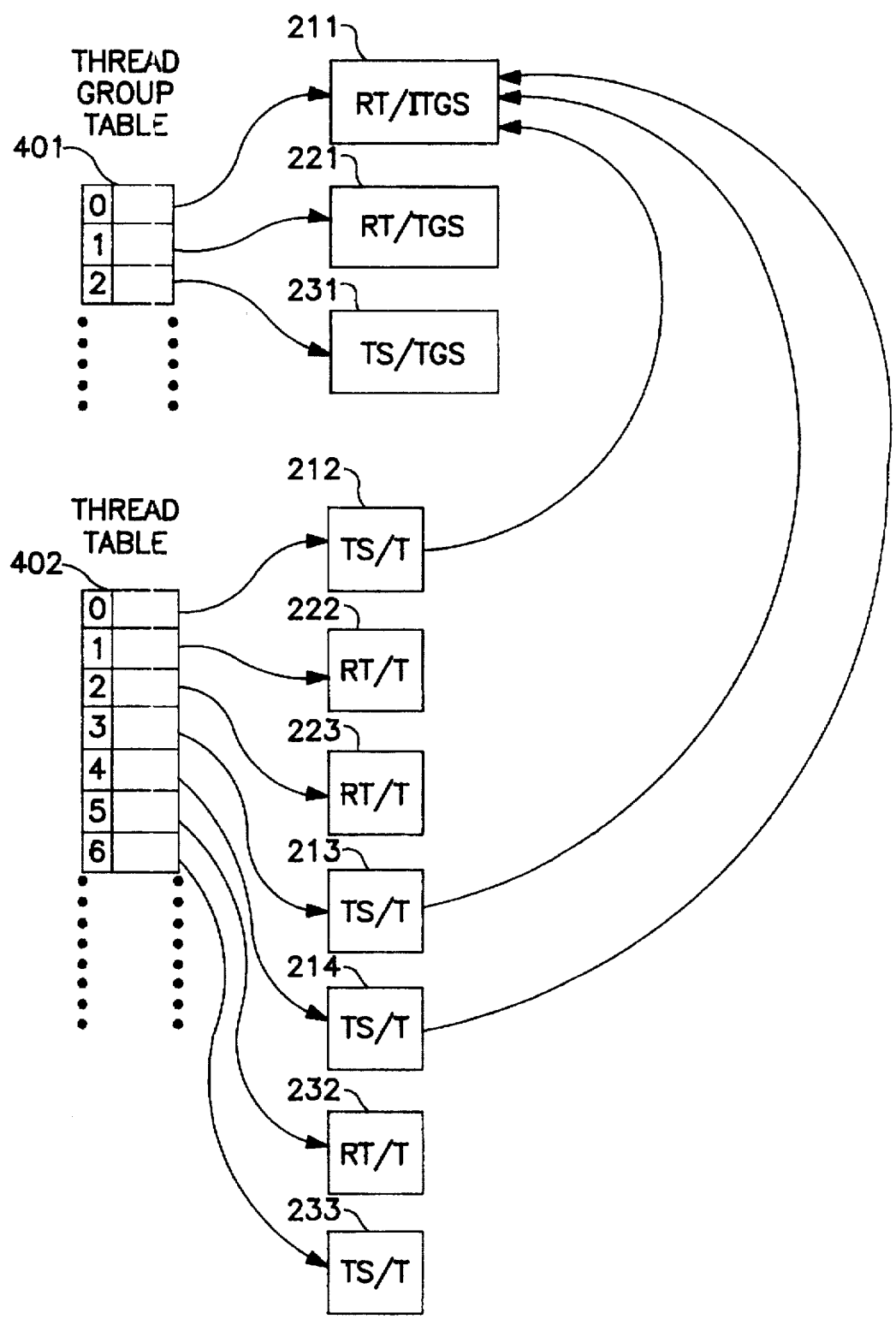
FIG. 4 shows the thread/thread group addressing relationship.
Figure 5A:
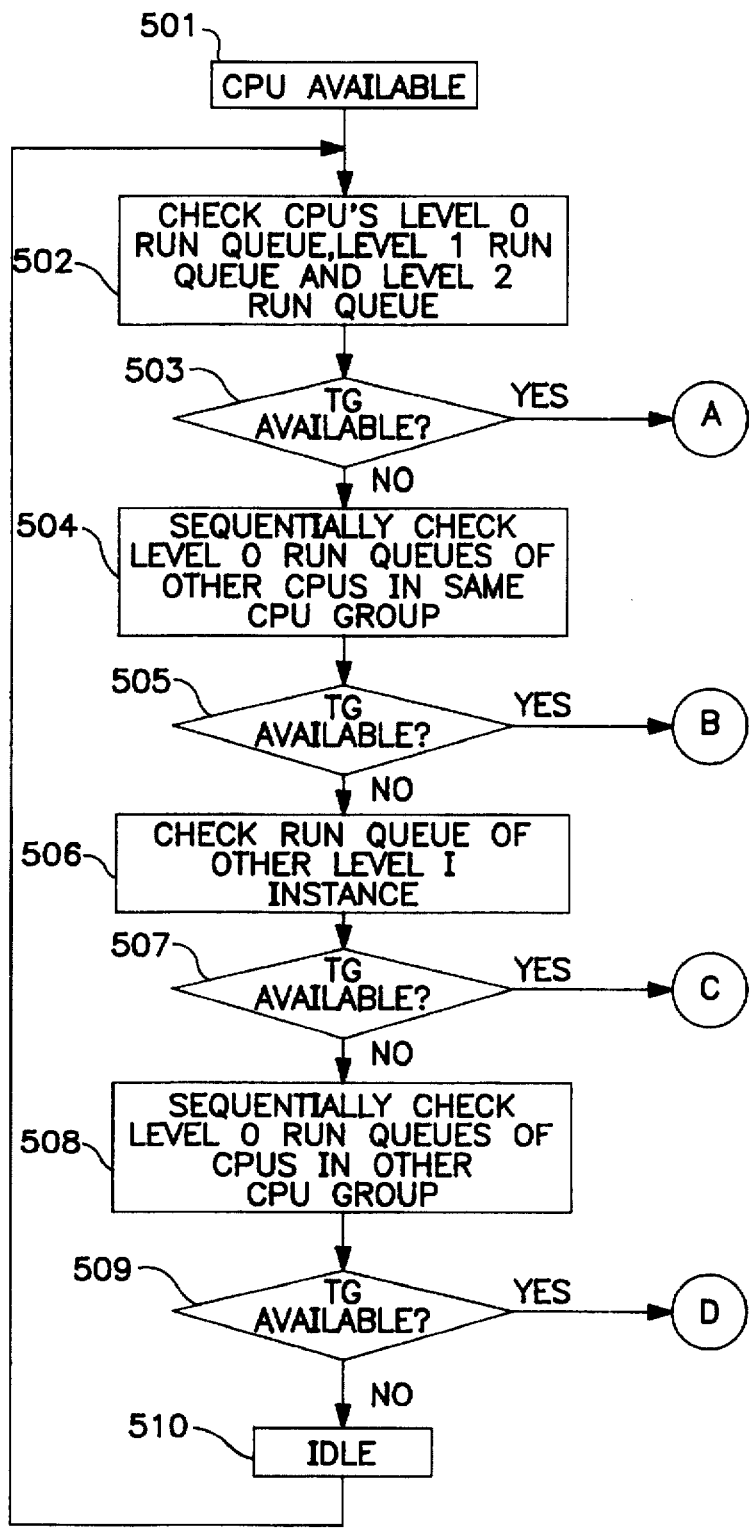
FIGS. 5A–5E show the flow of thread group selection and migration.
Figure 5B:
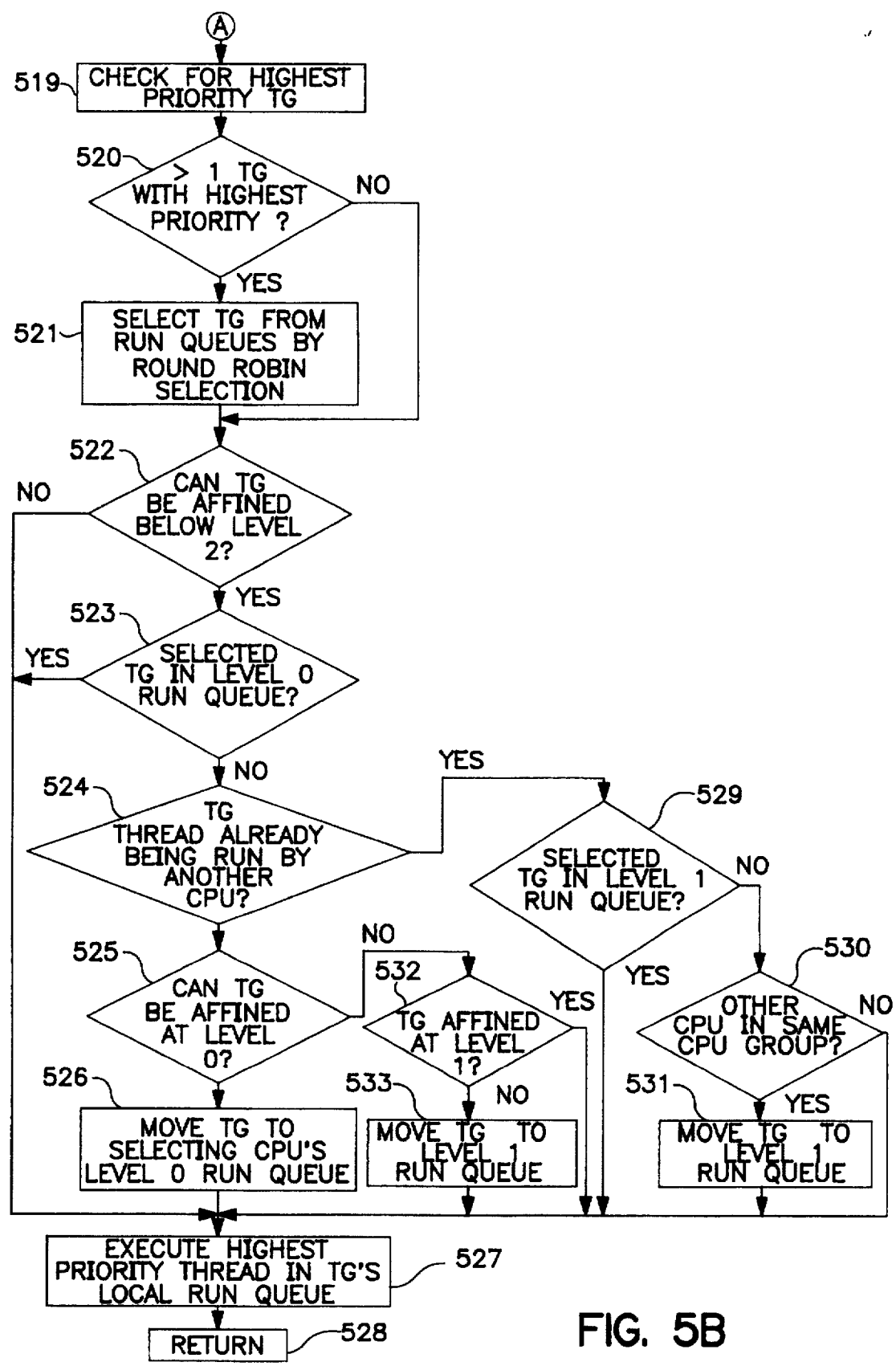
Figure 5C:
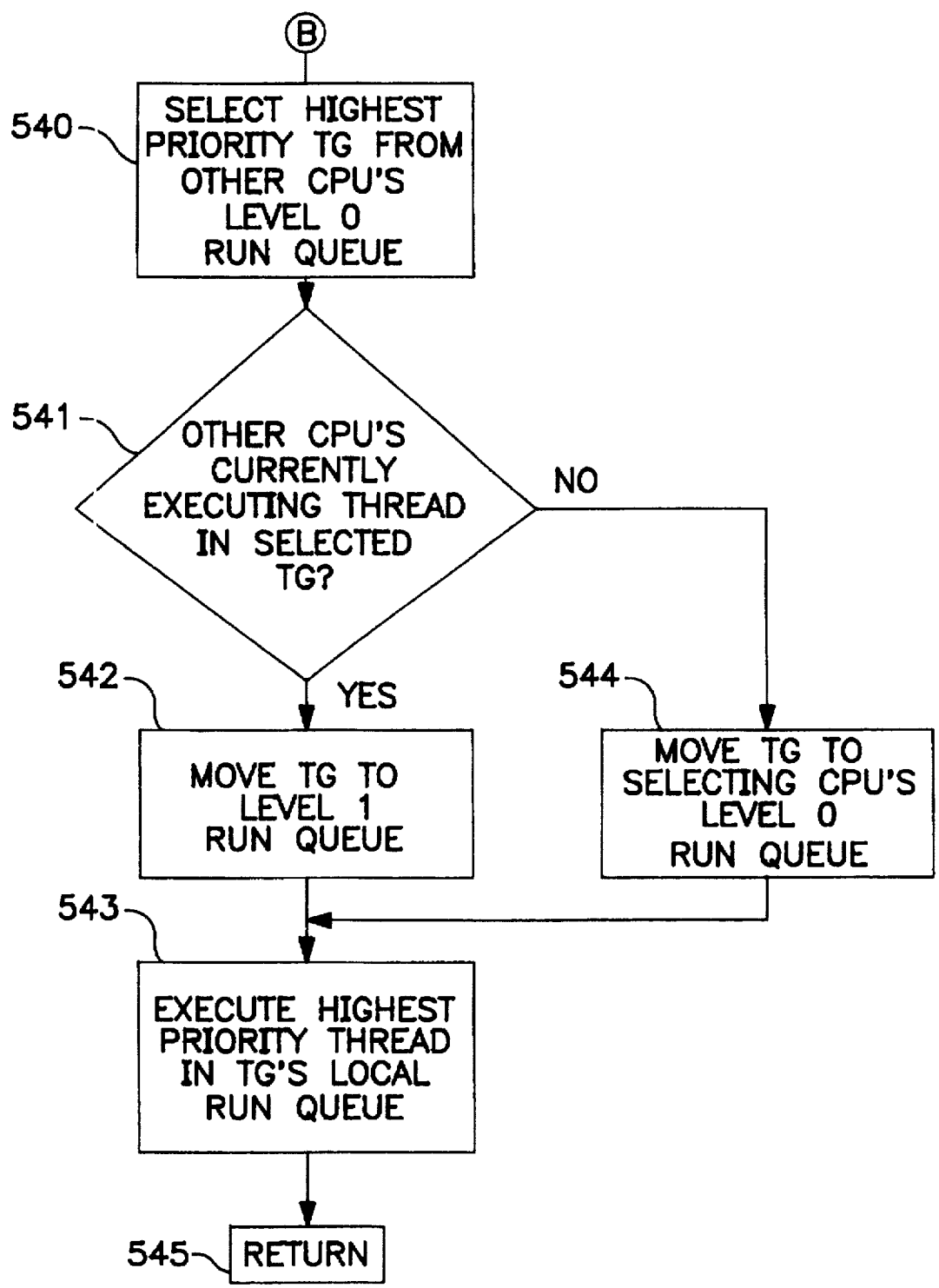
Figure 5D:
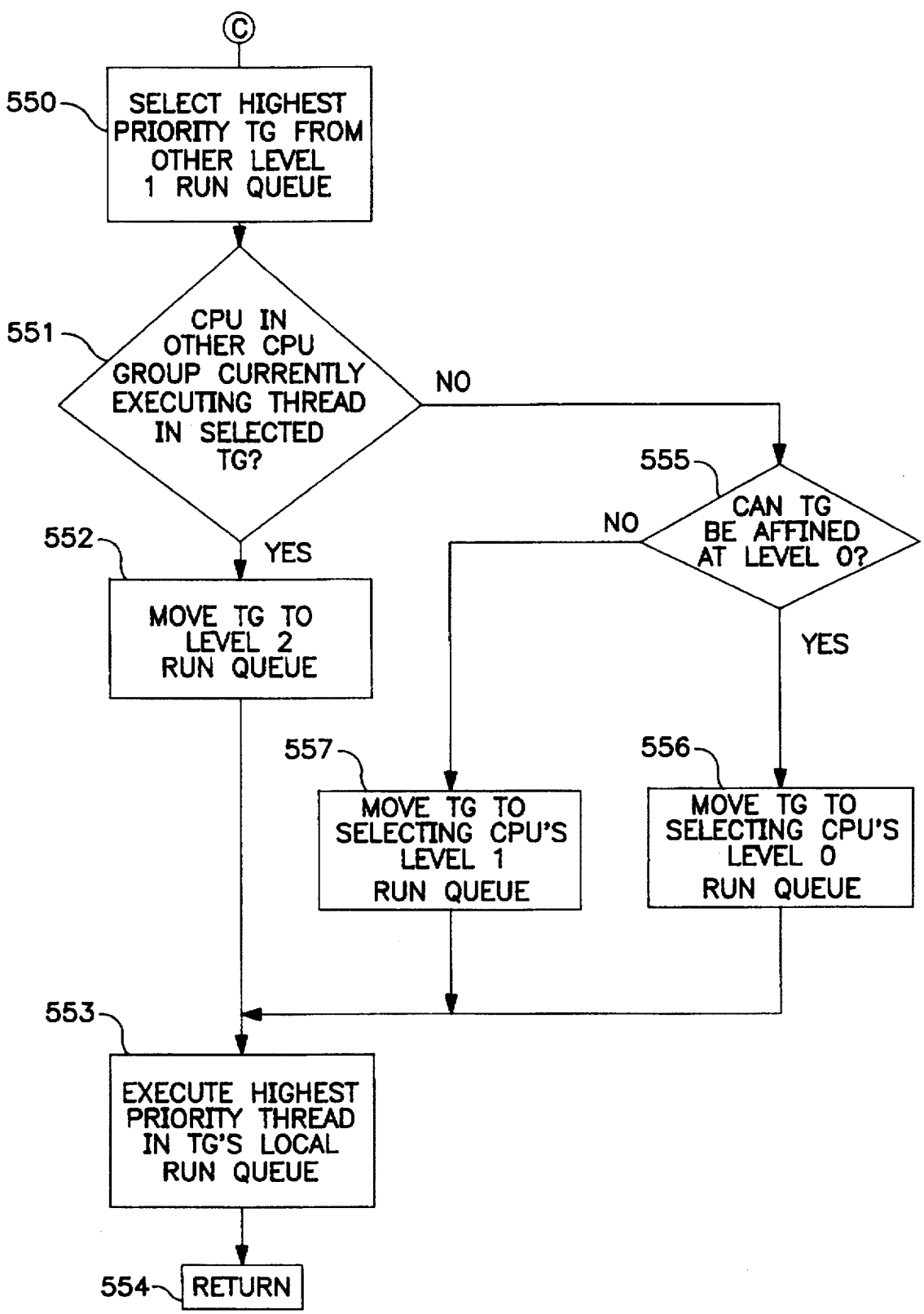
Figure 5E:
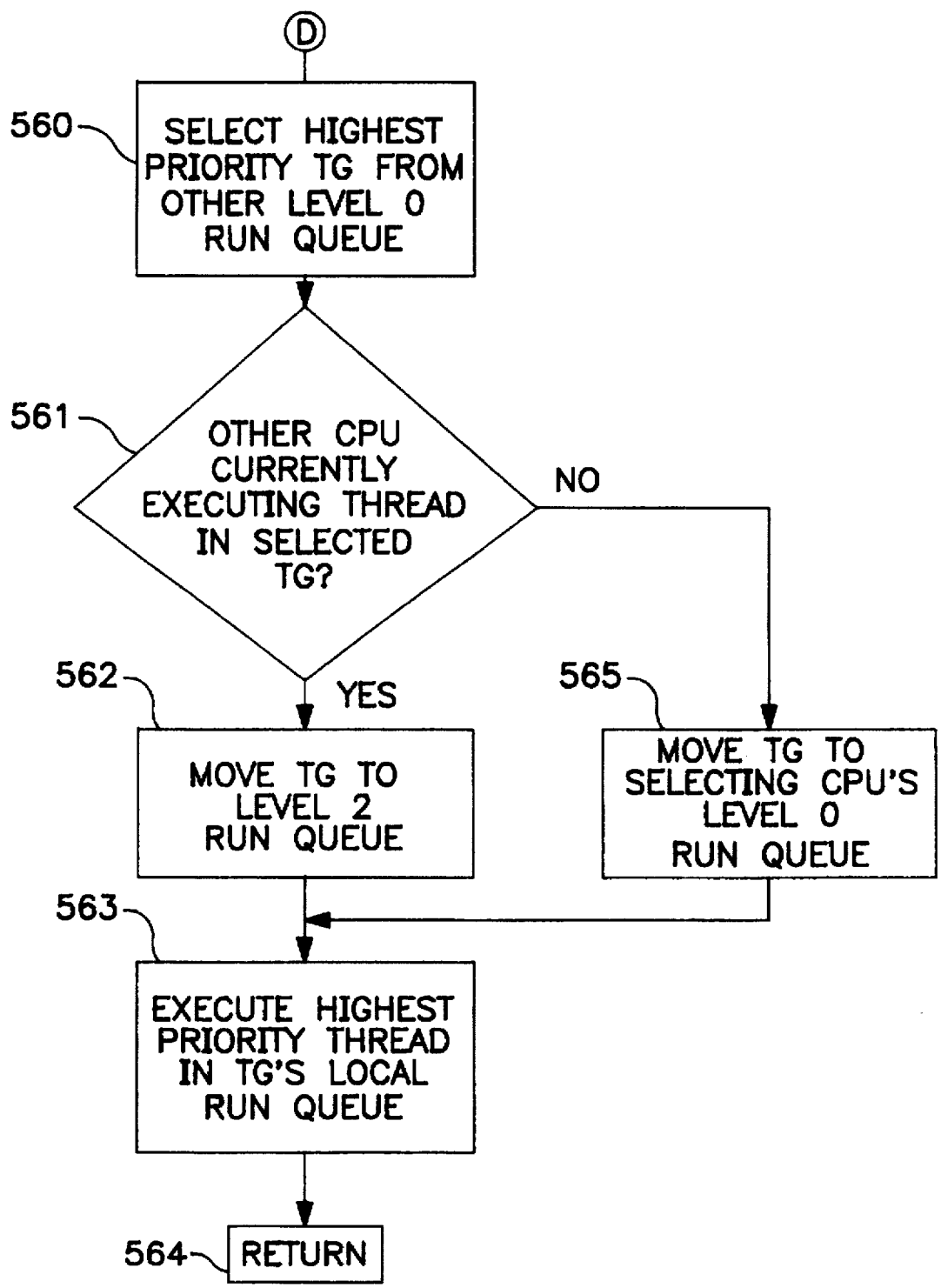

FIG. 4 shows the structure of the thread and thread group tables maintained in system memory. A thread group table 401 and a thread table 402 are maintained for each active process in the system. Thread group table 401 converts the thread group ID, which was assigned at the time the thread group was created, to a pointer to the thread group structure for that thread group. Thread table 402 converts the thread ID, which was assigned at the time the thread was created, to a pointer to the thread. Each thread entry also contains a pointer to its associated thread group structure. For clarity, the pointers from threads 222 and 223 to RT/TGS 220 and the pointers from threads 232 and 233 to TS/TGS 231 are not shown.

Looking again at FIG. 1, the various memory components within system 150 can be conceptualized as comprising three processing levels. Each level can be considered to contain one or more "instances" or nodes in the CPU/cache/shared memory hierarchy. Level 0 contains eight level 0 instances, each instance being one of the CPUs 100-107 and its associated caches 108. Level 1 contains two level 1 instances, each comprising four level 0 instances and a secondary cache. Finally, there is a single Level 2 instance containing the two level 1 instances and the shared system memory.

The design and operation of a multiprocessor system such as system 150 requires the reconciliation of two competing system goals. On the one hand, the system designer must insure that time critical operations are executed in a timely manner. On the other hand, the designer desires to maximize system throughput to the greatest extent possible. Referring to FIG. 1, all threads that are "visible" at Level 2 can be taken and executed by any of the eight CPUs 100-107. Since there are eight CPUs that may potentially run the threads at level 2, this maximizes the opportunity of each thread to run. This will, however, result in threads from the same thread group being run in different CPU groups (i.e., CPUs 100-101 or CPUs 104-107). System throughput suffers because threads from multiple thread groups spread across CPU groups will result in more cache activity.

At the other extreme, if all thread groups were to be assigned at Level 0 (i.e., each thread group assigned to a specific processor), local cache affinity would be clearly enhanced, since the likelihood of cache hits is higher with all threads that are working on the same set of data running on the same processor. Assignment of time critical threads to a single processor is not desirable, however, since it increases the likelihood that a CPU will become busy and not be able to execute all time critical threads on schedule.

As mentioned above, in a preferred embodiment of system 150, there are two levels of scheduling. All thread groups have a group priority and can be scheduled globally to compete for CPU resources available anywhere in system 150. Once a CPU has selected a thread group to run, the CPU will select a thread within the thread group according to the local priorities within the thread group. In both situations, the method of scheduling follows the policies and priorities defined in the POSIX P1003.4 standard.

Scheduling and Priority

Figure 3:
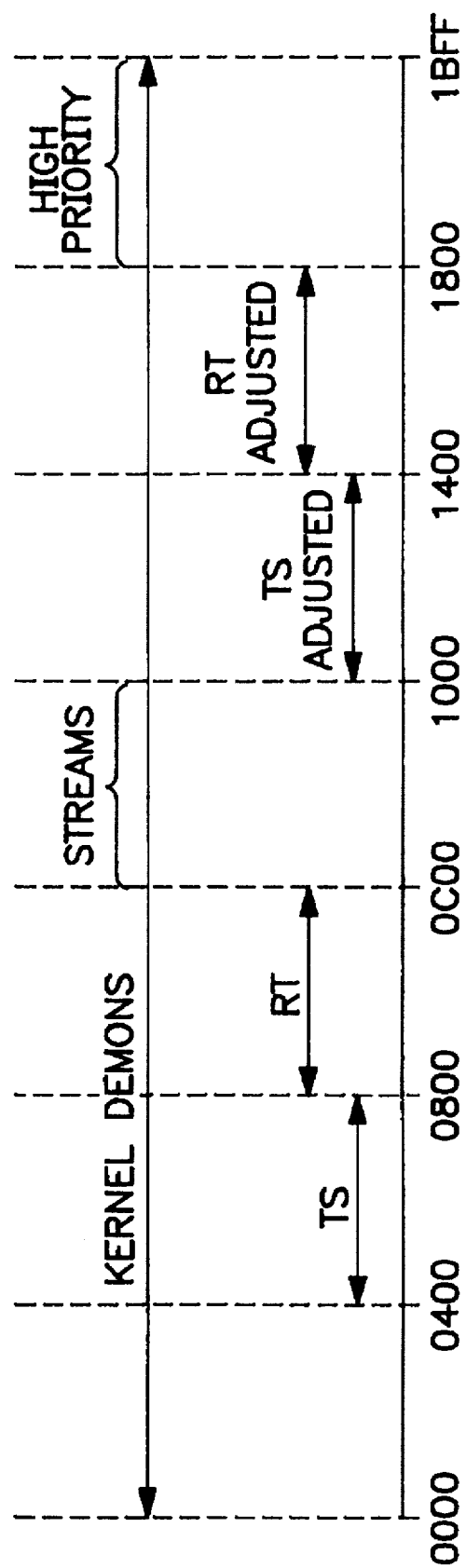
FIG. 3 shows the priority ranges for threads and thread groups.

Referring to FIG. 3, the priority distribution table for threads and thread groups is shown. While various priority level schemes could have been employed, in a preferred embodiment each thread and thread group will have an individual priority represented by a four digit hexadecimal number ranging from 0000, representing the lowest possible priority, to 1BFF, representing the highest. This range allows for a total of 7168 possible priority levels.

In a preferred embodiment, different types of threads and thread groups are normally assigned priorities in a limited portion of the possible range. Timesharing threads and thread groups are typically assigned priorities in the range of 0400 to 07FF while realtime threads and thread groups are assigned priorities in the range of 800 to 0BFF. A subset of all realtime threads are realtime operating system threads, such as UNIX kernel demons. Generally, middle priority demons, such as Streams in a UNIX system, will be assigned priorities in the range of 0C00 to 0FFF and high priority demons in the range of 1800 up. However, as indicated by the arrow in FIG. 4, if the user considers it necessary, kernel demons are allowed to receive a priority anywhere in the full priority range.

During execution of processes on the system, threads will occasionally acquire a critical kernel resource. To facilitate swift freeing of the resource, provisions are made for temporarily adjusting the thread's priority level. If a thread, other than a kernel demon, is holding a critical kernel resource, the thread's priority is adjusted upward and the thread is placed in the Level 2 global run queue with the thread groups. In a preferred embodiment, the adjustment is accomplished by adding hexadecimal C00 to the thread's initial priority. As shown in FIG. 4, this adjustment will give a thread with a critical resource a higher priority than the typical priority range of Streams demons, but not as high as the typical priority range of high priority kernel demons.

Streams and high priority demon threads in the kernel threads are scheduled without timeslice monitoring and will run until either they are preempted or they relinquish the CPU by blocking or yielding. The priority of these threads is not adjusted if a critical kernel resource is held. Realtime threads can be scheduled either with or without timeslice monitoring. If a realtime thread is scheduled without timeslice monitoring, it will run until either it is preempted by a higher priority thread or it voluntarily relinquishes the CPU by blocking or yielding. Timesharing threads all include timeslicing. All timesharing threads and all realtime threads with timeslicing enabled will be taken off the CPU if the thread group timeslice runs out as well as in the event of preemption, yielding or blocking.

Referring again to FIG. 2, the priorities of the thread groups and threads will be examined. As can be seen, the priority of the thread group can be either higher or lower than the priority of the individual threads within that thread group. In the example of process 200 in FIG. 2, TG 210 has been assigned a priority of 900, TG 220 has a priority of 810 and TG 230 has a priority of 500. If, for example, threads groups 210, 220 and 230 happened to be the only thread groups active in system 150, then the next available CPU would select TG 210 as the source of the next thread to run, since TG 210 has the highest priority of the available thread groups.

Once TG 210 is selected, the particular thread to be run is taken from the local thread group run queue. TG 210's active threads 212–214 have priorities of 405, 400 and 405 respectively. Threads are placed on their run queues in order of their priorities. The order of threads of equal priority within the run queue is determined by scheduling policy. In a preferred embodiment, if the thread is being scheduled for the first time, was taken off the CPU because of timeslice runout or, with the exception of kernel demons, is awakened after being blocked, the thread is placed on the run queue after all other threads of equal priority. If the thread had been preempted, it is placed ahead of other threads of equal priority.

CPU Affinity

As is well understood, it is highly desirable to maximize the likelihood that the data needed by a thread is to be found in the local cache of the CPU running the thread or, if not there, in the secondary cache associated with that CPU's CPU group. Trips to the main shared memory to get data not located in the caches introduce delay into the processing of the thread and impact overall system throughput. At the same time, steps taken to increase cache locality cannot impact the timely execution of time critical thread operations.

Associated with each thread group, and available to all CPUS in the system, are attributes specifying the thread group's allowable CPU or set of CPUs and the thread group's minimum allowed processing level. The CPU attribute identifies the specific CPU or set of CPUs in the system on which the thread group is allowed to run. Typically, this attribute will identify all CPUs in system 150 as being allowable, though a subset of system CPUs could be specified by the user. The minimum allowed processing level attribute specifies the minimum processing level (0, 1 or 2) at which the thread group may be affined.

The minimum allowed processing level for timesharing thread groups will typically be 0. This will allow the thread group to "migrate" down to either level 1, where the thread group will be affined to a particular group of four CPUs sharing a secondary cache at level 1, or to level 0, where the thread group will be affined to a particular CPU. Affining a thread group to a specific CPU or single group of CPUs improves cache locality for the threads in the thread group.

The minimum allowed processing level for realtime thread groups will typically be Level 2, which will preclude the thread group from migrating below the top processing level, ensuring that the thread group will always be available to the maximum number of CPUs. Response time for realtime thread groups is, therefore, optimized. The user can specify, via the minimum allowed processing attribute, that a realtime thread group be allowed to migrate to Level 1 or Level 0.

In a preferred embodiment of the invention, maintaining affinity between thread groups and processing instances is accomplished by means of the system run queues. In the described system, there will be a total of eleven run queues: eight level 0 queues (one for each CPU), two level 1 queues, and one level 2 queue. Every available thread group will be in one, and only one, of these eleven queues. A newly created thread group inherits the run queue of the creating thread group as wall as its affinity atributes.

Referring to FIG. 2, for example, when TG 230 is first created it is placed in the level 2 queue. Since TG 230 is a timesharing thread group, when one of the CPUs 100–107 eventually selects it to run for the first time, TG 230 is "pulled down" to the particular CPU that selected it. The selecting CPU accomplishes this by removing the thread group from the level 2 run queue and placing it in its own level 0 run queue. That CPU is now affined with TG 230 and will continue to run the threads in TG 230 until TG 230 is either reaffined or the system is reset, as discussed below.

Referring to FIGS. 5A–5E, the sequence followed by CPU 100 in selecting a thread group to execute will be discussed. A similar sequence is followed for all CPUs in the system. When CPU 100 becomes available to execute a thread (step 501), it looks (step 502) at its own Level 0 run queue, the Level 1 run queue for its associated cache 110 and the Level 2 run queue. If one or more thread groups are available, CPU 100 proceeds to check for the highest priority thread group (step 519). If the highest priority level is shared by thread groups on different run queues, CPU 100 will break the tie (step 521) by selecting the run queue to use in a round-robin fashion.

Once a thread group is selected, CPU 100 will begin the process of determining if the thread group can be moved closer to the CPU. If the minimum allowed processing level attribute of the thread group mandates that the group must remain at Level 2 (step 522), CPU 100 proceeds to thread execution (step 527), where the highest priority thread in the local run queue of the thread group is selected. If affinity below Level 2 is allowed, the CPU moves to step 523.

If the selected thread group is already affined with CPU 100 (step 523), the CPU proceeds to select a thread to execute (step 527). If the selected thread group is not currently in the CPU 100 run queue, CPU 100 determines (step 524) if a thread in the thread group is currently being run by another CPU in the system. If not, CPU 100 checks (step 525) if Level 0 affinity is allowed for the thread group. If so, the thread group is removed from the run queue where it currently resides and is placed (step 526) in the CPU 100 run queue. If it was determined at step 525 that the thread group cannot be affined at Level 0, as could be the case if the user had chosen to limit the allowable processing level for that thread group, it is determined (step 532) if the thread group is currently in the Level 1 run queue. If not, the thread group is moved from the Level 2 run queue to the Level 1 run queue (step 533) to increase affinity as much as allowed by the minimum processing level constraint. Returning to step 524, if a thread of the thread group is currently being executed by another CPU, CPU 100 cannot move the thread group into its Level 0 run queue. CPU 100 will still try to improve affinity as much as possible. If the thread group is in the Level 1 run queue associated with CPU 100 (step 529), no closer affinity is presently possible. If the thread group is not in the Level 1 run queue, but is in the Level 2 run queue, the thread group is pulled down to the cache 110 Level 1 run queue (step 531) making the thread group affined with CPU 100 and the other CPUs in the CPU 100 thread group. Finally, if the CPU running a thread in the thread group is in the other CPU group (CPU 104–107), the thread group must remain affined at Level 2 (step 530).

If an eligible thread group was not located at step 503, CPU 100 next checks (step 504) one-by-one the level 0 run queues of the other CPUs in its CPU group. In a preferred embodiment with four CPUs per CPU group, CPU 100 will first check the CPU 101 queue. If no eligible thread is found with CPU 101, CPU 100 will check CPU 102's queue and, if necessary, CPU 103's queue. As soon as a run queue is located that contains an available thread group (step 505), CPU 100 stops looking and selects the highest priority thread group from the run queue (step 540). If no thread is currently running in the available thread group (step 541), the thread group is taken away from the Level 0 run queue where it currently resides and is pulled over to the CPU 100 Level 0 run queue (step 544). The thread group will then be affined solely with CPU 100 at level 0. Alternatively, if a thread in the available thread group is currently running on the other CPU at step 541, CPU 100 will move the thread group from the other CPU's level 0 run queue to the level 1 run queue shared by CPUs 100–103 (step 542). The thread group is then at processing level 1 and made available to all four CPUs in CPU 100's CPU group.

If CPU 100 has checked the run queues of the other three CPUs in its CPU group and still has not located an eligible thread group, CPU 100 then begins to check (step 506) the other level 1 run queue for eligible thread groups affined to the other secondary cache 111. In a preferred embodiment, all level 1 instances would be checked for eligible threads before proceeding to check the level 0 run queues of the CPUs in other CPU groups. For example, in a 16 processor embodiment of the invention there would be four secondary caches at level 1. CPU 100 would sequentially check each of the other three secondary caches for an available thread group before proceeding to check the level 0 run queues of the CPUs in other CPU groups.

If an available thread group is located at step 507, CPU 100 stops looking and proceeds to step 550. If a thread in the selected thread group is currently running on one of the CPUs in the other CPU group at step 551, the thread group is pulled up to the least common node in the CPU hierarchy (step 552). In this case, the least common node is shared system memory 120 and, therefore, the thread group would be pulled up and placed on the level 2 run queue. Alternatively, if no thread is currently running in the thread group, the thread group will either be moved to the CPU 100 Level 0 run queue (step 556) if Level 0 affinity is allowed (step 555) or, if affinity at Level 0 is not allowed for the thread group, the thread group will be added to the Level 1 run queue for CPU 100's CPU group (step 557).

If CPU 100 has still not located an available thread group, CPU 100 then begins to sequentially check CPUs 104–107 in the other CPU group (step 508). If an eligible thread group is located, the highest priority thread is selected (step 560). If a thread is currently running, the thread group is pulled up to the least common node in the CPU hierarchy. The least common node in this situation is again shared memory 120 and, therefore, the thread group would be pulled up and entered in the level 2 run queue (step 562). If no thread is currently running, the thread group is taken away from the other CPU and pulled over to CPU 100's level 0 queue (step 565).

Finally, if no eligible threads are located anywhere in the system, CPU 100 will run an idle loop (step 510) until a thread group becomes available. From the above description, it can be seen that timesharing thread groups can migrate up and down through the three processing levels of the system can, at various times, be affined with individual CPUs, with groups of CPUs or with all CPUs in the system.

Load Balancing

The system described above has an inherent tendency to balance the processing load. If the system is in a relatively idle period, timesharing thread groups tend to get pulled up to higher level run queues and have their threads shared by multiple CPUs. CPUs that find themselves with a light workload will help out busier CPUs and, over time, tend to take over some timesharing thread groups from the busier CPUs in the system. Conversely, if the system becomes busy, timesharing thread groups tend to migrate downward. This closer affinity between timesharing thread groups and CPUs improves cache locality and is desirable.

In most situations, the timesharing thread groups will distribute themselves in a substantially even manner across the CPUs. It is theoretically possible, however, that thread groups in a busy system may become distributed in an unbalanced manner such that some CPUs are busier than others causing some thread groups to be executed at a slower than desirable rate.

As a check against operation of the system in an unbalanced condition over a prolonged period of time, the system will periodically clear all level 0 and level 1 run queues and pull all thread groups back up to level 2. The thread groups will immediately begin to again migrate downward. This reset function prevents any unbalanced load condition from existing for more than a relatively short period of time. In a preferred embodiment, this reset function occurs every 10 seconds, though other time periods may be configured.

The invention may be implemented in other specific forms without departing from the spirit or essential characteristics thereof. For example, while a system having three levels of run queues has been discussed above, it will be understood that the same concepts can be readily extended to systems organized with more than three processing levels. The scope of the invention is indicated by the appended claims rather than by the foregoing description and all changes within the meaning and range of equivalency of the claims are intended to embraced therein.

I claim:

1. A data processing system for simultaneously executing a plurality of processing tasks, the system comprising:

a plurality of processors, each processor having first cache means;

a plurality of second cache means, each second cache means being connected to a subset of the processors;

shared memory means connected to each second cache means; and means for retaining a plurality of run queues, including a plurality of Level 0 run queues, each Level 0 run queue being associated with one of the processors and containing the processing tasks currently affined to its associated processor; a plurality of Level 1 run queues, each Level 1 run queue being associated with one of the subsets of processors and containing the processing tasks currently affined to its associated subset of processors, and a Level 2 run queue associated with all processors and containing the processing tasks currently affined to all processors in the system, each processing task being included in only one of the run queues.

2. The system of claim 1 further comprising means for moving at least one processing task among the run queues.

3. The system of claim 2 wherein each processing task has means for indicating the allowable run queue levels at which that processing task may be affined.

4. The system of claim 1 further comprising means for identifying when a processor is available to begin execution of a processing task, means for selecting a processing task to be run by the identified available processor and means for determining if the selected processing task should be moved to a run queue different from the run queue where the selected processing task is currently affined.

5. The system of claim 4 wherein each processing task has means for indicating the allowable run queue levels at which that processing task may be affined.

6. The system of claim 4 wherein each processing task has means for indicating which of the processors are allowed to run that processing task.

7. In a multiprocessor system having a shared memory accessible to all processors and a plurality of secondary cache memories, each secondary cache memory being accessible to a subset of the processors, each processor having an associated Level 0 run queue containing the processing tasks affined with that CPU, each subset of processors having an associated Level 1 run queue containing the processing tasks affined with that subset of processors and all processors sharing a Level 2 run queue containing the processing tasks affined with all processors in the system, a processing task containing one or more processing threads: a method of selecting the next processing task to be executed by an available processor comprising the steps of:

a) checking the Level 0 run queue of the available processor, the Level 1 run queue of the available processor's subset of processors and the Level 2 run queue for available tasks;

b) if one or more available tasks are located at step a, selecting one of the available tasks for execution.

c) if no available tasks are located at step a, checking the Level 0 run queue of one of the other processors in the the available processor's processor subset, d) if one or more available tasks are located at step c, selecting a task from the one or more available tasks;

e) repeating steps c and d for each other processor in the available processor's subset;

f) if no available task is located at steps c–e, checking the Level 1 run queue of one of the other processor groups in the system;

g) if one or more available tasks are located at step f, selecting one of the available tasks for execution;

h) repeating step f and g for each other Level 1 run queue in the system i) if no available task is located at step f–h, checking the Level 0 run queue of one the processors in one of the other processor subsets;

j) if one or more available task are located at step i, selecting the thread group for execution.

k) repeating steps i and j for each processor in each other processor group in the system, l) if no available task is located at steps i–k, running an idle loop in the available processor.

8. The method of claim 7 wherein each processing task has an associated run queue indicator indicating the minimum processing level at which the associated processing task may be affined and where step b) includes the additional steps of:

1) if the selected task can be affined below Level 2 and the selected task is not already in the Level 0 run queue of the available processor and the processing task is not currently being run by another processor and the selected task can be affined at Level 0, moving the selected task to the Level 0 run queue of the available processor;

2) if the selected task can be affined below level 2 and is not already in the Level 0 run queue of the available processor and is not currently being run by another processor and cannot be affined at Level 0 and is not currently affined at Level 1, moving the selected task to the Level 1 run queue of the available processor, 3) if the selected task can be affined below Level 2 and is not already in the Level 0 run queue of the available processor and is currently being run by another processor and is not currently in a Level 1 run queue and the other processor currently running the selected task is a member of the same subset of processors to which the available processor belongs, moving the selected task to the Level 1 run queue of the available processor.

9. The method of claim 7 wherein step d) includes the additional steps of:
 1) if the other processor associated with the run queue checked at step c) is currently running the selected processing task, moving the selected processing task to the Level 1 run queue of the available processor;
 2) if the other processor associated with the run queue checked at step c) is not currently running the selected processing task, moving the selected processing task to the Level 0 run queue of the available processor.

10. The method of claim 7 wherein step g) includes the additional steps of:
 1) if any processor associated with the run queue checked at step f) is currently running the selected task, moving the selected task to the Level 2 run queue;
 2) if no processor associated with the run queue checked at step f) is currently running the selected task and the selected task can be affined at Level 0, moving the selected task to the Level 0 run queue of the available processor;
 3) if no processor associated with the run queue checked at step f) is currently running the selected task and the selected task cannot be affined at Level 0, moving the selected task to the Level 1 run queue of the available processor.

11. The method of claim 7 wherein step i) includes the additional steps of:
 1) if the processor associated with the run queue checked at step j) is currently running the selected task, moving the task to the Level 2 run queue;
 2) if the processor associated with the run queue checked at step j) is not currently running the selected task, moving the task to the Level 0 run queue of the available processor.

12. A multiprocessor system capable of executing a plurality of processing threads, the system comprising: a plurality of processors, memory means connected to and shared by the plurality of processors, one or more processes executing in the system, each process containing one or more processing thread groups, each thread group containing at least a thread group structure, and wherein each thread group has an associated priority level and each thread has an associated priority level, the priority level of each thread being independent of the priority level of its associated thread group.

13. A multiprocessor system capable of executing a plurality of processing threads, the system comprising: a plurality of processors, memory means connected to and shared by the plurality of processors, one or more processes executing in the system, each process containing one or more processing thread groups, each thread group containing at least a thread group structure, and wherein at least one thread within a thread group has means for creating a new thread within its thread group.

14. A multiprocessor system capable of executing a plurality of processing threads, the system comprising: a plurality of processors, memory means connected to and shared by the plurality of processors, one or more processes executing in the system, each process containing one or more processing thread groups, each thread group containing at least a thread group structure, and wherein at least one thread within a thread group has means for creating a new thread in a new thread group.

15. The system of claim 14 wherein the new thread group inherits the thread group structure of the thread group containing the thread which created the new thread group.

16. The system of claim 14 wherein the new thread group is assigned a priority and scheduling policy by the thread which created the new thread group.

17. The system of claim 14 wherein the new thread group is affined to the same run queue as the run queue of the thread group of the thread which created the new thread group.

18. The system of claim 14 wherein the new thread group is assigned the same scheduling policy as the scheduling policy of the thread group which created the new thread group.

19. A multiprocessor system capable of executing a plurality of processing threads, the system comprising: a plurality of processors, memory means connected to and shared by the plurality of processors, one or more processes executing in the system, each process containing one or more processing thread groups, each thread group containing at least a thread group structure, and wherein the thread group structure maintains the scheduling policy and priority for use in scheduling the thread group.

20. A multiprocessor system capable of executing a plurality of processing threads, the system comprising: a plurality of processors, memory means connected to and shared by the plurality of processors, one or more processes executing in the system, each process containing one or more processing thread groups, each thread group containing at least a thread group structure, and wherein the thread group structure maintains the cumulative timeslice information for all threads within that thread group.

21. A multiprocessor system capable of executing a plurality of processing threads, the system comprising: a plurality of processors, memory means connected to and shared by the plurality of processors, one or more processes executing in the system, each process containing one or more processing thread groups, each thread group containing at least a thread group structure, and wherein the thread group structure maintains the processor accounting information for all threads within that thread group.

22. A multiprocessor system capable of executing a plurality of processing threads, the system comprising: a plurality of processors, memory means connected to and shared by the plurality of processors, one or more processes executing in the system, each process containing one or more processing thread groups, each thread group containing at least a thread group structure, and wherein the thread group structure maintains a thread group ID and each thread maintains a thread ID.

23. A multiprocessor system capable of executing a plurality of processing threads, the system comprising: a plurality of processors, memory means connected to and shared by the plurality of processors, one or more processes executing in the system, each process containing one or more processing thread groups, each thread group containing at least a thread group structure, and wherein each process contains (a) at least one thread group table containing pointers to thread group structures in the process and (b) at least one thread table containing pointers to threads within the thread groups.

24. The system of claim 23 wherein each thread maintains a pointer to its associated thread group structure.

25. A multiprocessor system capable of executing a plurality of processing threads, the system comprising: a plurality of processors, memory means connected to and shared by the plurality of processors, one or more processes executing in the system, each process containing one or more processing thread groups, each thread group containing at least a thread group structure, and wherein the thread group structure contains a list of processors by which that thread group may be executed.

26. A multiprocessor system capable of executing a plurality of processing threads, the system comprising: a plurality of processors, memory means connected to and shared by the plurality of processors, one or more processes executing in the system, each process containing one or more processing thread groups, each thread group containing at least a thread group structure, and wherein the thread group structure contains an indicator of the minimum allowable run queue level at which that thread group may be affined.

27. The system of claim 26 wherein the minimum allowable run queue level for realtime thread groups is Level 2.

28. The system of claim 26 wherein the minimum allowable run queue level for timeshare thread groups is Level 0.

29. In a multiprocessor system having a shared memory accessible to all processors; a plurality of secondary cache memories, each secondary cache memory being accessible to a subset of the processors; a plurality of Level 0 run queues, each Level 0 run queue being associated with one processor and containing the processing tasks affined with that CPU; a plurality of Level 1 run queues, each Level 1 run queue being associated with a subset of processors and containing the processing tasks affined with that subset of processors; a Level 2 run queue associated with all processors and containing the processing tasks affined with all processors in the system; and wherein each task is associated with a run queue indicator indicating the minimum run queue level at which that task may be affined; a method of determining if a task should be moved from the run queue where the task currently resides to another run queue in the system when the task is selected for running by an available processor, the method comprising the steps of:

a) if the selected task is currently in the Level 2 run queue and the selected task is currently being run by another processor and the other processor currently running the task is a member of the same subset of processors to which the available processor belongs and the task can be affined at Level 1, moving the selected task to the Level 1 run queue of the available processor;

b) if the selected task is currently in the Level 2 run queue and the selected task is not currently being run by another processor and the task can be affined at Level 0, moving the selected task to the Level 0 run queue of the available processor;

c) if the selected task is currently in the Level 2 run queue and the selected task is not currently being run by another processor and the task can be affined at Level 1 and the task cannot be affined at Level 0, moving the selected task to the Level 1 run queue of the available processor;

d) if the selected task is currently in the Level 1 run queue of the available processor and the selected task is not currently being run by another processor and the selected task can be affined at Level 0, moving the selected task to the Level 0 run queue of the available processor;

e) if the selected task is currently in a Level 1 run queue which is not the Level 1 run queue of the available processor and the task is not currently being run by another processor and the task can be affined at Level 0, moving the task to the Level 0 run queue of the available processor;

f) if the selected task is currently in a Level 1 run queue which is not the Level 1 run queue of the available processor and the task is not currently being run by another processor and the task cannot be affined at Level 0, moving the task to the Level 1 run queue associated with the available processor;

g) if the selected task is currently in a Level 1 run queue which is not the Level 1 run queue of the available processor and the task is currently being run by another processor, moving the task to the Level 2 run queue;

h) if the selected task is currently in the Level 0 run queue of another processor and the other processor is currently running the selected task and the other processor is not a member of the same subset of processors to which the available processor belongs, moving the selected task to the Level 2 run queue;

i) if the selected task is currently in the Level 0 run queue of another processor and the other processor is currently running the selected task and the other processor is a member of the same subset of processors to which the available processor belongs, moving the selected task to the Level 1 run queue of the available processor; and j) if the selected task is currently in the Level 0 run queue of another processor and the other processor is not currently running the selected task, moving the selected task to the Level 0 run queue of the available processor.

30. In a multiprocessor system having a shared memory accessible to all processors; a plurality of secondary cache memories, each secondary cache memory being accessible to a subset of the processors; a plurality of Level 0 run queues, each Level 0 run queue being associated with one processor and containing the processing tasks affined with that CPU; a plurality of Level 1 run queues, each Level 1 run queue being associated with a subset of processors and containing the processing tasks affined with that subset of processors; a Level 2 run queue associated with all processors and containing the processing tasks affined with all processors in the system; and wherein each task is associated with a run queue indicator indicating the minimum run queue level at which that task may be affined; a method of determining if a task in a Level 0 run queue should be moved to another run queue in the system when the task is selected for running by an available processor, the method comprising the steps of:

a) if the selected task is not currently being run by another processor and the selected task is not in the Level 0 run queue of the available processor, moving the selected task to the Level 0 run queue of the available processor;

b) if the selected task is currently being run by another processor and the other processor currently running the task is a member of the same subset of processors to which the available processor belongs, moving the selected task to the Level 1 run queue of the available processor; and c) if the selected task is currently being run by another processor and the other processor currently running the task is not a member of the same subset of processors to which the available processor belongs, moving the selected task to the Level 2 run queue.

31. In a multiprocessor system having a shared memory accessible to all processors; a plurality of secondary cache memories, each secondary cache memory being accessible to a subset of the processors; a plurality of Level 0 run queues, each Level 0 run queue being associated with one processor and containing the processing tasks affined with that CPU; a plurality of Level 1 run queues, each Level 1 run queue being associated with a subset of processors and containing the processing tasks affined with that subset of processors; a Level 2 run queue associated with all processors and containing the processing tasks affined with all processors in the system; and wherein each task is associated with a run queue indicator indicating the minimum run queue level at which that task may be affined; a method of determining if a task in a Level 1 run queue should be moved to another run queue in the system when the task is selected for running by an available processor, the method comprising the steps of:

a) if the selected task can be affined at Level 0 and is not currently being run by another processor, moving the selected task to the Level 0 run queue of the available processor;

b) if the selected task cannot be affined at Level 0 and is not currently being run by another processor and is not currently in the Level 1 run queue of the available processor, moving the selected task to the Level 1 run queue of the available processor; and c) if the selected task is currently being run by a processor that is not a member of the same subset of processors to which the available processor belongs, moving the selected task to the Level 2 run queue.

32. In a multiprocessor system having a shared memory accessible to all processors; a plurality of secondary cache memories, each secondary cache memory being accessible to a subset of the processors; a plurality of Level 0 run queues, each Level 0 run queue being associated with one processor and containing the processing tasks affined with that CPU; a plurality of Level 1 run queues, each Level 1 run queue being associated with a subset of processors and containing the processing tasks affined with that subset of processors; a Level 2 run queue associated with all processors and containing the processing tasks affined with all processors in the system; and wherein each task is associated with a run queue indicator indicating the minimum run queue level at which that task may be affined; a method of determining if a task in the Level 2 run queue should be moved to another run queue in the system when the task is selected for running by an available processor, the method comprising the steps of:

a) if the selected task can be affined at Level 0 and is not currently being run by another processor, moving the selected task to the Level 0 run queue of the available processor;

b) if the selected task can be affined at Level 1 and cannot be affined at Level 0 and is not currently being run by another processor, moving the selected task to the Level 1 run queue of the available processor; and c) if the selected task can be affined at Level 1 and is currently being run by one or more other processors and all other processors currently running the task are members of the same subset of processors to which the available processor belongs, moving the selected task to the Level 1 run queue of the available processor.

* * * * *